United States Patent
Noh et al.

(10) Patent No.: US 12,476,245 B2
(45) Date of Patent: Nov. 18, 2025

(54) POSITIVE ELECTRODE ACTIVE MATERIAL FOR LITHIUM SECONDARY BATTERY, METHOD FOR MANUFACTURING SAME, AND LITHIUM SECONDARY BATTERY INCLUDING SAME

(71) Applicant: SK INNOVATION CO., LTD., Seoul (KR)

(72) Inventors: Mi Jung Noh, Daejeon (KR); Jik Soo Kim, Daejeon (KR); Kook Hyun Han, Daejeon (KR)

(73) Assignee: SK ON CO., LTD., Seoul (KR)

( * ) Notice: Subject to any disclaimer, the term of this patent is extended or adjusted under 35 U.S.C. 154(b) by 1246 days.

(21) Appl. No.: 17/266,842

(22) PCT Filed: Aug. 13, 2019

(86) PCT No.: PCT/KR2019/010253
§ 371 (c)(1),
(2) Date: Feb. 8, 2021

(87) PCT Pub. No.: WO2020/036396
PCT Pub. Date: Feb. 20, 2020

(65) Prior Publication Data
US 2021/0359293 A1 Nov. 18, 2021

(30) Foreign Application Priority Data
Aug. 13, 2018 (KR) .................. 10-2018-0094178

(51) Int. Cl.
*H01M 4/36* (2006.01)
*C01G 53/50* (2025.01)
*H01M 4/505* (2010.01)
*H01M 4/525* (2010.01)
*H01M 10/0525* (2010.01)

(52) U.S. Cl.
CPC ............ *H01M 4/366* (2013.01); *C01G 53/50* (2013.01); *H01M 4/505* (2013.01); *H01M 4/525* (2013.01); *H01M 10/0525* (2013.01); *C01P 2004/03* (2013.01); *C01P 2004/04* (2013.01); *C01P 2004/61* (2013.01); *C01P 2006/40* (2013.01)

(58) Field of Classification Search
CPC ...... H01M 4/366; H01M 4/505; H01M 4/525; H01M 10/0525; C01G 53/50; C01P 2004/03; C01P 2004/04; C01P 2004/61; C01P 2006/40
See application file for complete search history.

(56) References Cited

U.S. PATENT DOCUMENTS

| | | | |
|---|---|---|---|
| 2005/0158632 A1* | 7/2005 | Wang Chen | H01M 50/417 |
| | | | 429/317 |
| 2014/0205898 A1 | 7/2014 | Lee et al. | |
| 2016/0156030 A1* | 6/2016 | Sun | H01M 4/366 |
| | | | 429/231.95 |
| 2017/0092935 A1 | 3/2017 | Sun et al. | |
| 2017/0133668 A1* | 5/2017 | Kim | H01M 4/505 |

FOREIGN PATENT DOCUMENTS

| | | |
|---|---|---|
| CN | 105378985 A | 3/2016 |
| CN | 104852026 B | 4/2017 |
| CN | 107968198 A | 4/2018 |
| CN | 108091843 A | 5/2018 |
| EP | 3316357 A1 | 5/2018 |
| JP | 5549437 B2 | 7/2014 |
| JP | 2015015230 A | 1/2015 |
| JP | 2015-103306 A | 6/2015 |
| KR | 10-2013-0063868 A | 6/2013 |
| KR | 10-2013-0100737 A | 9/2013 |
| KR | 10-2015-0062251 A | 6/2015 |
| KR | 10-2017-0053368 A | 5/2017 |
| KR | 10-2017-0075915 A | 7/2017 |
| KR | 10-2017-0093085 A | 8/2017 |
| KR | 10-2018-0015044 A | 2/2018 |
| WO | 2017/069407 A1 | 4/2017 |

OTHER PUBLICATIONS

Lu, X., Li, X., Wang, Z., Guo, H., Yan, G., Yin, X.—A modified co-precipitation process to coat $LiNi1/3Co1/3Mn1/3O2$ onto $LiNi0.8Co0.1Mn0.1O2$ for improving the electrochemical performance, Applied Surface Science 297 (2014), pp. 182-187 (Year: 2014).*
Extended European Search Report issued by the European Patent Office on Apr. 8, 2022.
Office Action issued by the CNIPA for Application No. 201980051951.2, dated Jun. 8, 2023.
Office Action for the Korean Patent Application No. 10-2018-0094178 issued by the Korean Intellectual Property Office on Mar. 20, 2023.
Junhyeok Kim et al., A highly stabilized nickel-rich cathode material by nanoscale epitaxy control for high-energy lithium-ion batteries, Energy & Environmental Science, 2018.
Office Communication of Third-party submission for Korean Patent Application No. 10-2018-0094178 issued by the Korean Intellectual Property Office on May 27, 2022.

* cited by examiner

*Primary Examiner* — Anca Eoff
(74) *Attorney, Agent, or Firm* — IP & T GROUP LLP

(57) ABSTRACT

A cathode active material for a lithium secondary battery according to embodiments of the present invention includes a lithium metal oxide particle which includes a core part and a shell part and contains nickel (Ni), cobalt (Co) and manganese (Mn). A total Ni content of the lithium metal oxide particle is 70 mol % or more based on a total 100 mol % of Ni, Co and Mn. The shell part includes a depth region in a range of 10 to 100 nm from a surface of the lithium metal oxide particle, and a Co content thereof in the depth region is 1.4 to 6 times a Co content of the core part. Stability of the lithium secondary battery may be improved through surface treatment using high content of Co.

11 Claims, 8 Drawing Sheets

[FIG. 1]
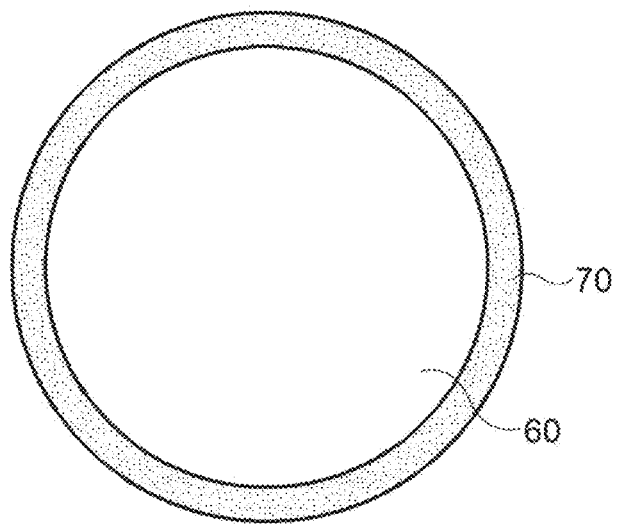
[FIG. 2]
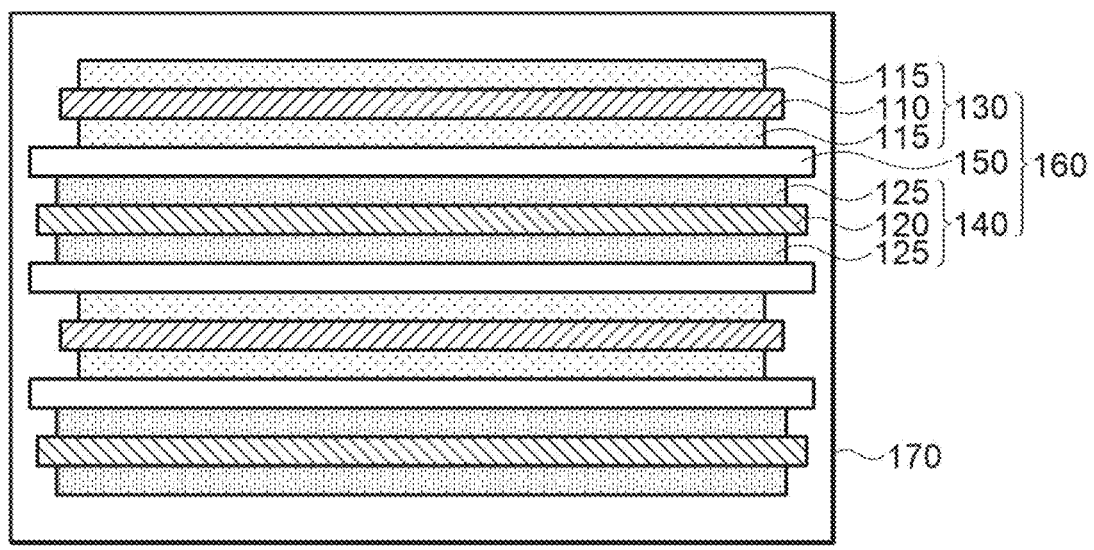

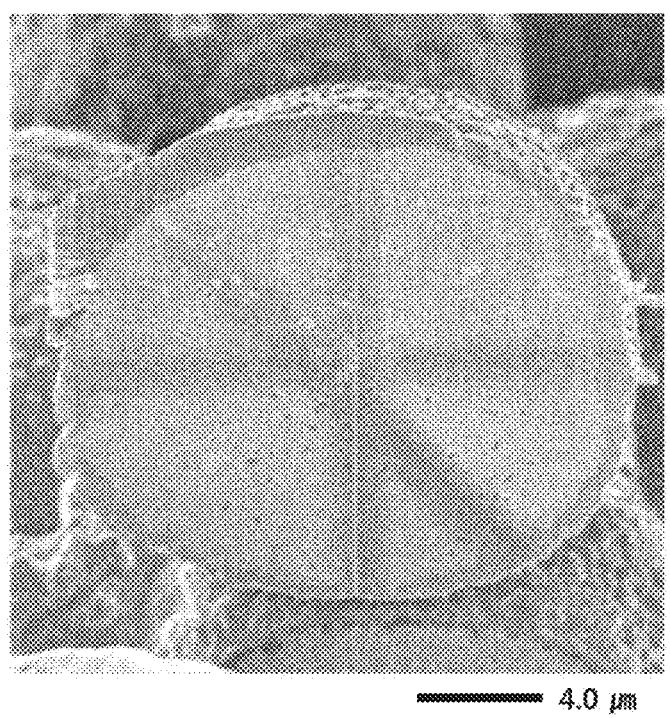
[FIG. 3A]

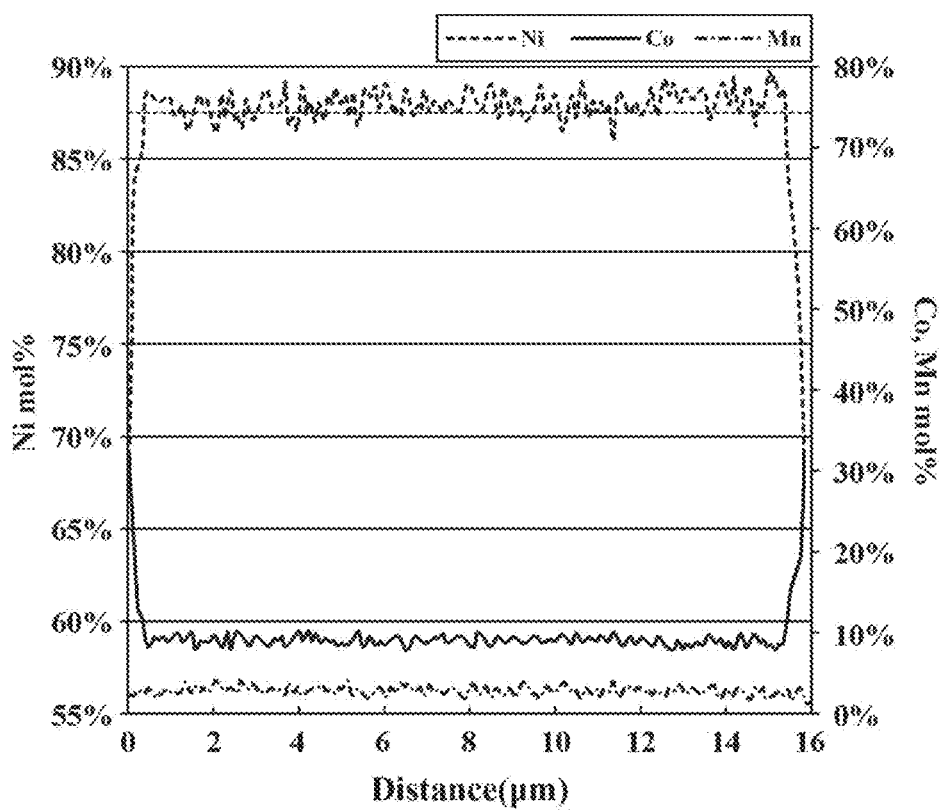
[FIG. 3B]

[FIG. 4A]
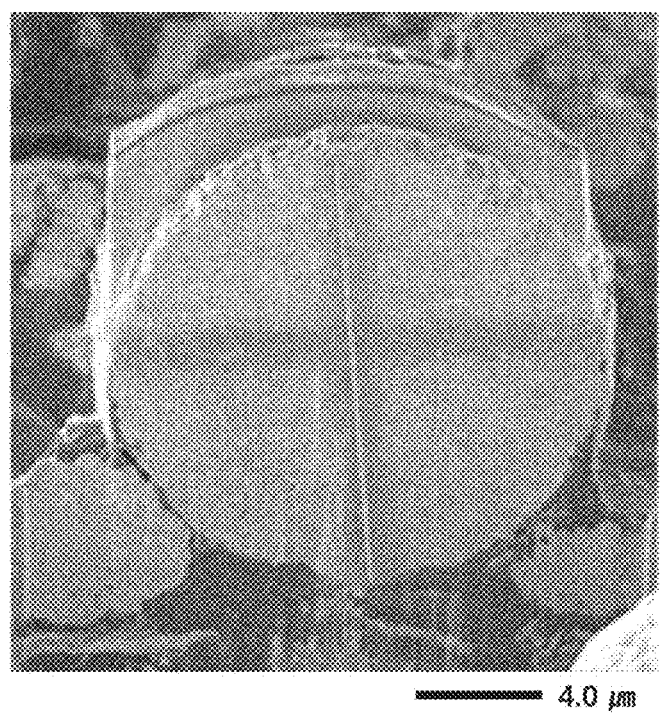

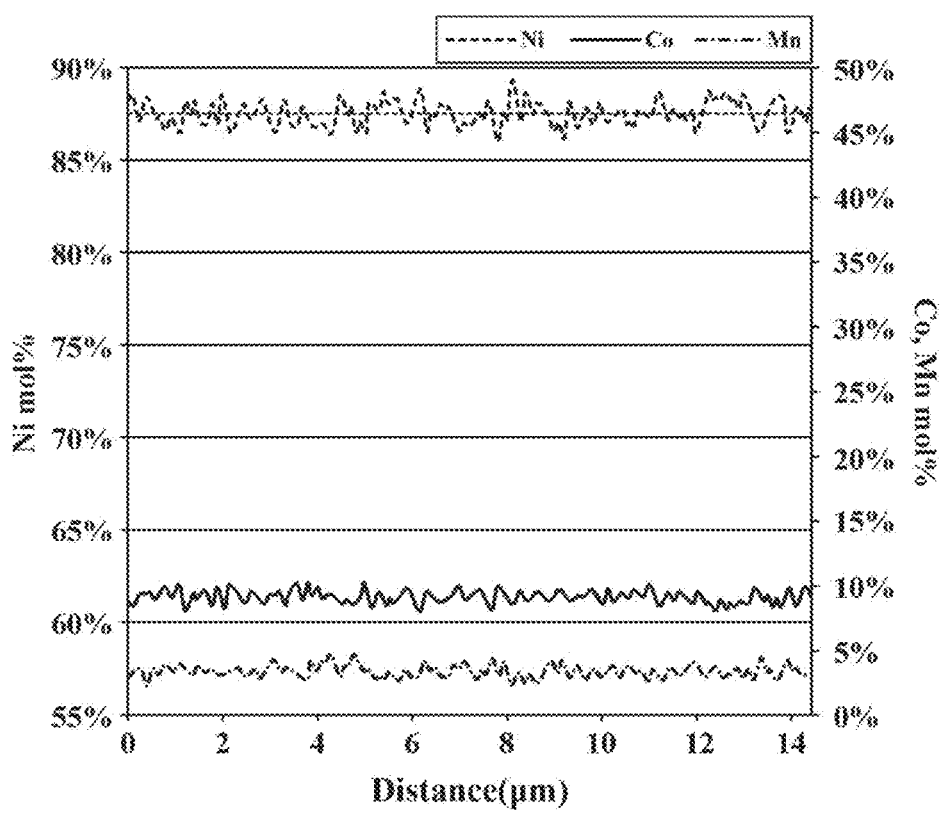
[FIG. 4B]

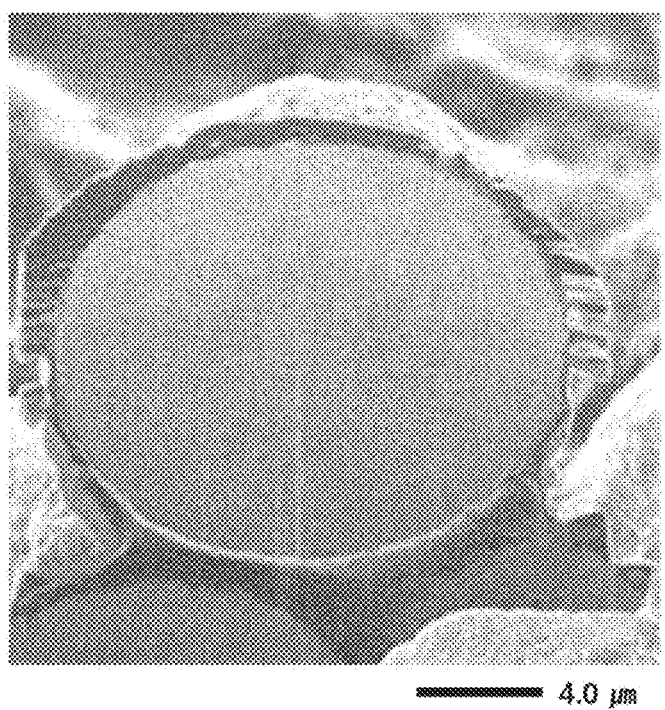
[FIG. 5A]

[FIG. 5B]
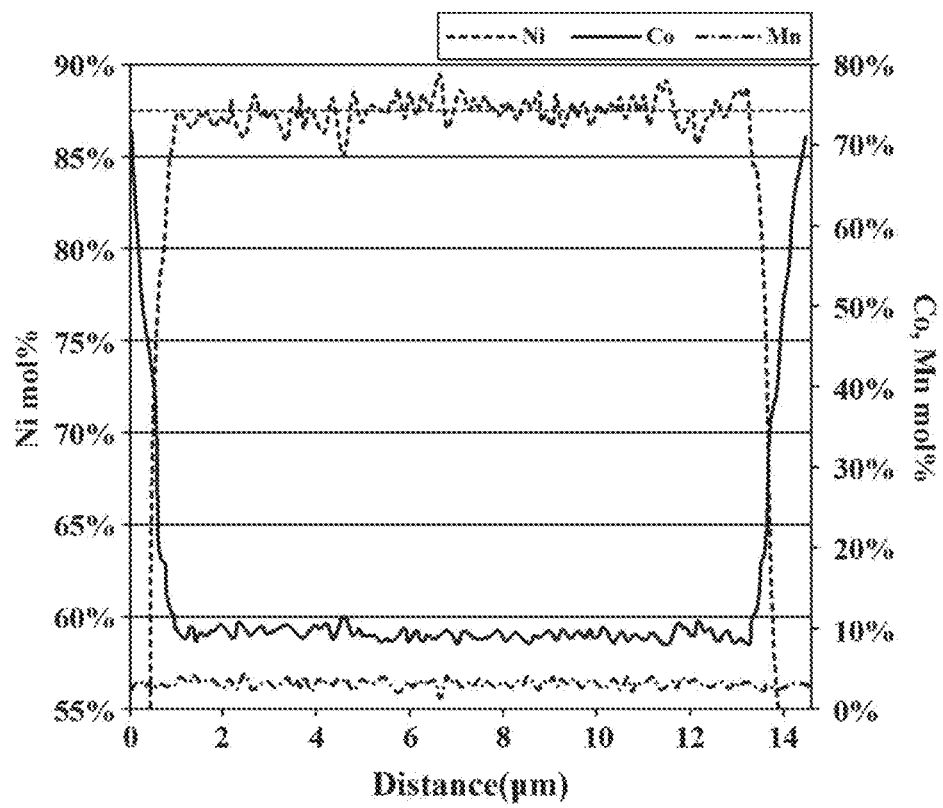
[FIG. 6]
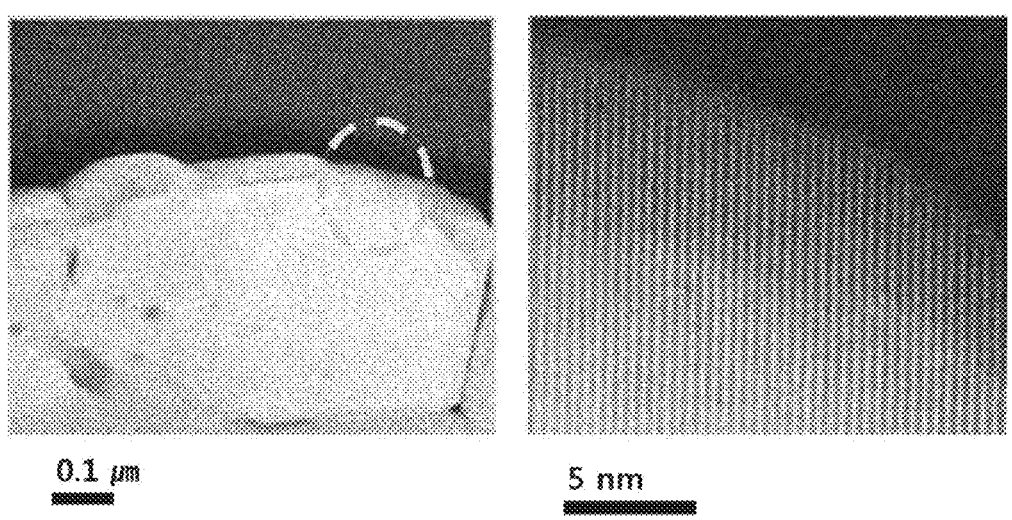

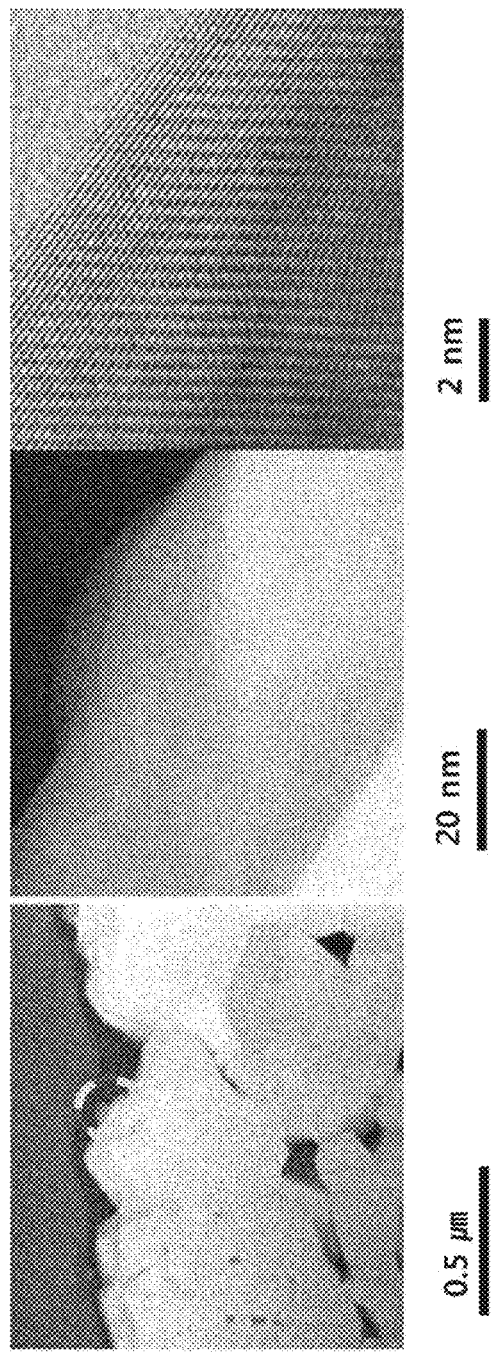
[FIG. 7I]

POSITIVE ELECTRODE ACTIVE MATERIAL FOR LITHIUM SECONDARY BATTERY, METHOD FOR MANUFACTURING SAME, AND LITHIUM SECONDARY BATTERY INCLUDING SAME

The present application is a national stage application of PCT/KR2019/010253 filed on Aug. 13, 2019, which claims the benefit of Korean Patent Applications No. 10-2018-0094178 filed on Aug. 13, 2018. The disclosures of which are incorporated by reference herein in their entirety.

TECHNICAL FIELD

The present invention relates to a cathode active material for a lithium secondary battery, a method for manufacturing the same, and a lithium secondary battery including the same, and more particularly, to a lithium metal oxide-based cathode active material, a method for manufacturing the same, and a lithium secondary battery including the same.

BACKGROUND ART

A secondary battery is a battery which can be repeatedly charged and discharged. With rapid progress of information and communication, and display industries, the secondary battery has been widely applied to various portable telecommunication electronic devices such as a camcorder, a mobile phone, a notebook computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, and a nickel-hydrogen battery. Among them, the lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include: an electrode assembly including a cathode, an anode, and a separation membrane (separator); and an electrolyte in which the electrode assembly is impregnated. The lithium secondary battery may further include, for example, a pouch-shaped sheath in which the electrode assembly and the electrolyte are housed.

In the lithium secondary battery, a lithium metal oxide is used as a cathode active material, and it is preferable to have a high capacity, a high output, and high life-span characteristics. Accordingly, there is a need to maintain a chemical stability even when the lithium metal oxide is repeatedly charged and discharged.

However, when the lithium metal oxide is exposed to the atmosphere or comes in contact with the electrolyte, by-products of lithium or nickel may be generated due to a side reaction on surfaces of lithium metal oxide particles. In this case, the life-span and operational stability of the lithium secondary battery may be deteriorated.

For example, Korean Patent Laid-Open Publication No. 10-2017-0093085 discloses a cathode active material including a transition metal compound and an ion adsorbing binder, but there is a limitation in securing sufficient operational stability of the cathode active material as described above.

SUMMARY OF INVENTION

Problems to be Solved by Invention

It is an object of the present invention to provide a cathode active material for a lithium secondary battery having excellent operational stability and reliability.

In addition, another object of the present invention is to provide a method for manufacturing a cathode active material for a lithium secondary battery having excellent operation stability and reliability.

Further, another object of the present invention is to provide a lithium secondary battery including the cathode active material having excellent operational stability and reliability.

Means for Solving Problems

To achieve the above objects, the following technical solutions are adopted in the present invention.

According to an aspect of the present invention, there is provided a cathode active material for a lithium secondary battery including: a lithium metal oxide particle which includes a core part and a shell part and contains nickel (Ni), cobalt (Co) and manganese (Mn), wherein a total Ni content of the lithium metal oxide particle is 70 mol % or more based on a total 100 mol % of Ni, Co and Mn, the shell part includes a depth region in a range of 10 to 100 nm from a surface of the lithium metal oxide particle, and a Co content thereof in the depth region is 1.4 to 6 times a Co content of the core part.

In some embodiments, a total average composition of the lithium metal oxide particle may be represented by Formula 1 below:

$$LiNi_{tx}Co_{ty}Mn_{1-tx-ty-tz}M1_{tz}O_{2-a} \qquad [Formula\ 1]$$

(In Formula 1, M1 is at least one selected from the group consisting of Na, Mg, Ca, Ti, V, Cr, Cu, Zn, Ge, Sr, Ag, Ba, Zr, Nb, Mo, Al, Ga and B, and, tx, ty, tz and a have a relationship of $0.7 \le tx < 1$, $0 < ty \le 0.2$, $0 \le tz \le 0.1$, $0 \le a \le 0.5$, and $0 < 1-tx-ty-tz$).

In some embodiments, in Formula 1, the tx and ty may have a relationship of $0.75 \le tx \le 0.9$ and $0.1 \le ty \le 0.2$.

In some embodiments, the core part may have a composition represented by Formula 2 below, and the shell part has a composition represented by Formula 3 below:

$$LiNi_{cx}Co_{cy}Mn_{1-cx-cy-cz}M2_{cz}O_{2-b} \qquad [Formula\ 2]$$

(In Formula 2, M2 is at least one selected from the group consisting of Na, Mg, Ca, Ti, V, Cr, Cu, Zn, Ge, Sr, Ag, Ba, Zr, Nb, Mo, Al, Ga and B, and, cx, cy, cz and b have a relationship of $0.7 \le cx < 1$, $0 < cy \le 0.2$, $0 \le cz \le 0.1$, $0 \le b \le 0.5$, and $0 < 1-cx-cy-cz$)

$$LiNi_{sx}Co_{sy}Mn_{1-sx-sy-sz}M3_{sz}O_{2-c} \qquad [Formula\ 3]$$

(In Formula 3, M3 is at least one selected from the group consisting of Na, Mg, Ca, Ti, V, Cr, Cu, Zn, Ge, Sr, Ag, Ba, Zr, Nb, Mo, Al, Ga and B, and, sx, sy, sz and c have a relationship of $0.6 \le sx < 0.9$, $0 < sy \le 0.4$, $0 \le sz \le 0.1$, $0 \le c \le 0.5$, and $0 < 1-sx-sy-sz$).

In some embodiments, in Formula 2, the cx and cy may have a relationship of $0.75 \le cx \le 0.95$ and $0.05 \le cy \le 0.15$.

In some embodiments, in Formula 3, the sx and sy may have a relationship of $0.6 \le sx \le 0.9$ and $0.08 \le sy \le 0.3$.

In some embodiments, metals other than lithium contained in the lithium metal oxide particle are composed of Ni, Co and Mn.

In some embodiments, the core part may have a uniform composition over an entire area of the core part.

In some embodiments, the shell part may include a concentration gradient.

In some embodiments, a content of Ni may be decreased, while a content of Co may be increased from an outermost surface of the core part to an outermost surface of the shell part.

In some embodiments, a content of Mn may be constant over an entire region of the lithium metal oxide particle.

According to another aspect of the present invention, there is provided a lithium secondary battery including: an electrode assembly including a cathode including the cathode active material according to the above 1, an anode, and a separation membrane disposed between the cathode and the anode; an outer case configured to house the electrode assembly; and an electrolyte in which the electrode assembly is impregnated in the outer case.

According to another aspect of the present invention, there is provided a method for manufacturing a cathode active material for a lithium secondary battery, the method including: preparing a cathode active material precursor by reacting active material metal salts including nickel (Ni) salt, cobalt (Co) salt and manganese (Mn) salt; preparing a preliminary lithium metal oxide particle by reacting the cathode active material precursor with a lithium precursor; forming a preliminary shell part on the preliminary lithium metal oxide particle by reacting with a cobalt salt; and forming a shell part and a core part by performing heat treatment on the preliminary lithium metal oxide particle on which the preliminary shell part is formed.

In some embodiments, the heat treatment may be performed at a temperature of 650 to 800° C.

In some embodiments, lithium and nickel on the surface of the preliminary lithium metal oxide particle may be diffused into the preliminary shell part through the heat treatment to be crystallized.

In some embodiments, a Co content of the shell part may be adjusted to 1.4 to 6 times a Co content of the core part.

Advantageous Effects

The cathode active material for a lithium secondary battery according to the above-described embodiments of the present invention includes a lithium metal oxide particle containing nickel, cobalt, and manganese, and the lithium metal oxide particle may include a core part and a shell part surrounding the core part. The shell part has a higher cobalt content than the core part, and may be provided as a surface coating layer of the lithium metal oxide particle.

Since the shell part containing relatively high content of cobalt having high conductivity is formed as the surface coating layer, an increase in resistance of lithium metal oxide caused by separate surface coating may be suppressed. Accordingly, it is also possible to improve a capacity and output characteristics by reducing a surface resistance while enhancing a chemical stability of the lithium metal oxide particle.

BRIEF DESCRIPTION OF DRAWINGS

FIG. 1 is a schematic cross-sectional view illustrating a lithium metal oxide particle included in a cathode active material for a lithium secondary battery according to exemplary embodiments.

FIG. 2 is a schematic cross-sectional view illustrating a lithium secondary battery according to exemplary embodiments.

FIGS. 3A and 3B are an SEM image and a graph showing a composition of a lithium metal oxide particle prepared according to Example 4, respectively.

FIGS. 4A and 4B are an SEM image and a graph showing a composition of a lithium metal oxide particle prepared according to Comparative Example 3, respectively.

FIGS. 5A and 5B are an SEM image and a graph showing a composition of a lithium metal oxide particle prepared according to Comparative Example 5, respectively.

FIG. 6 is TEM images of a surface of a lithium metal oxide particle of Example 4.

FIG. 7 is TEM images of a surface of a lithium metal oxide particle of Comparative Example 5.

MODE FOR CARRYING OUT INVENTION

According to embodiments of the present invention, there is provided a cathode active material for a lithium secondary battery including a lithium metal oxide particle containing nickel, cobalt and manganese, and the lithium metal oxide particle may include a core part and a shell part surrounding the core part, thereby having improved chemical and operational stabilities, and a method for manufacturing the same. In addition, according to embodiments of the present invention, there is provided a lithium secondary battery including a cathode manufactured of the cathode active material.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

FIG. 1 is a schematic cross-sectional view illustrating a lithium metal oxide particle included in a cathode active material for a lithium secondary battery according to exemplary embodiments.

Referring to FIG. 1, the cathode active material may include the lithium metal oxide particle 50 which includes a core part 60 and a shell part 70. According to exemplary embodiments, the lithium metal oxide particle 50 may be NCM-based lithium metal oxide particle containing nickel (Ni), cobalt (Co) and manganese (Mn).

The core part 60 corresponds to a central portion of the lithium metal oxide particle 50, and the shell part 70 may be provided as a coating layer which entirely surrounds a surface of the core part 60. For example, the remaining portion of the lithium metal oxide particle 50 except for the shell part 70 may be defined as the core part 60.

The shell part 70 may be formed in a thickness of a predetermined distance from an outermost surface of the lithium metal oxide particle 50 in a radial direction. In some embodiments, the shell part 70 may have a thickness in a range of about 100 to 500 nm from the outermost surface. Preferably, the shell part 70 has a thickness of about 100 to 300 nm from the outermost surface.

If the thickness of the shell part 70 exceeds about 500 nm, capacity and output activity through the high nickel content in the core part 60 may be deteriorated. If the thickness of the shell part 70 is less than about 100 nm, effects of surface coating through the shell part 70 may not be sufficiently implemented.

In one embodiment, the shell part 70 may include a depth region in a range of about 10 to 100 nm from the outermost surface of the lithium metal oxide particle 50 (a region between 10 nm and 100 nm from the outermost surface in the radial direction).

In some embodiments, the lithium metal oxide particle 50 may have a structure of secondary particle formed by aggregation of primary particles. The lithium metal oxide particle 50 may have a mean particle diameter (D50) (e.g., a mean particle diameter of the secondary particle) of about 3 to about 25 μm. In a preferred embodiment, the mean particle diameter (D50) of the lithium metal oxide particle 50 may be about 10 to 20 μm.

As described above, the lithium metal oxide particle 50 may include NCM-based lithium metal oxide. According to exemplary embodiments, a total Ni content of the lithium metal oxide particle may be 70 mol % or more based on a total 100 mol % of Ni, Co and Mn.

In some embodiments, a total average composition of the lithium metal oxide particle 50 may be represented by Formula 1 below.

  [Formula 1]

In Formula 1, M1 represents a dopant element, and may be selected from Na, Mg, Ca, Ti, V, Cr, Cu, Zn, Ge, Sr, Ag, Ba, Zr, Nb, Mo, Al, Ga or B. In Formula 1, tx, ty, tz and a may have a relationship of $0.7 \leq tx < 1$, $0 < ty \leq 0.2$, $0 \leq tz \leq 0.1$, and $0 \leq a \leq 0.5$. In a preferred embodiment, in Formula 1, the tx, ty, tz and a have a relationship of $0.75 \leq tx \leq 0.9$, $0.1 \leq ty \leq 0.2$, $0 \leq tz \leq 0.1$, and $0 \leq a \leq 0.5$.

The above-described tx, ty and tz may be adjusted under a condition that 1-tx-ty-tz, which is a content of manganese (Mn), is greater than 0.

For example, nickel may be provided as a metal associated with a capacity of the lithium secondary battery. The higher the content of nickel, the better the capacity and output of the lithium secondary battery. As represented by Formula 1, since the lithium metal oxide particle 50 contain the most excessive amount of nickel (Ni) as a whole among metals (metals other than lithium), a high output cathode active material or a lithium secondary battery may be implemented.

However, if the content of nickel is excessively increased, the life-span of the lithium secondary battery may be reduced, and it may be disadvantageous in terms of mechanical and electrical stabilities. For example, when the content of nickel is excessively increased, faults such as an ignition, short-circuit, etc. may not be sufficiently suppressed upon occurring a penetration caused by an external object. Thus, according to exemplary embodiments, manganese (Mn) may be distributed along therewith as a whole to compensate for chemical and mechanical instabilities caused by nickel.

The term "excess" as used herein refers to the largest content or molar ratio of metals except for lithium. The term "content" or "concentration" as used herein may mean a molar ratio in the lithium metal oxide.

According to exemplary embodiments, the core part 60 and the shell part 70 may have different compositions from each other.

In some embodiments, the core part 60 may have a higher nickel content and a lower cobalt content than the shell part 70. According to exemplary embodiments, the cobalt content of the shell part 70 may be about 1.4 to 6 times the cobalt content of the core part 60.

If the cobalt content of the shell part 70 is less than about 1.4 times that of the core part 60, the effects of surface coating described below may not be sufficiently implemented. If the cobalt content of the shell part 70 exceeds about 6 times that of the core part 60, a phase separation occurs due to an excessive difference in the composition between the core part 60 and the shell part 70, and the crystal structure may be weakened, thereby causing a deterioration in the mechanical stability.

Preferably, in consideration of the stability of the cathode active material and capacity/life-span stability through surface coating, the cobalt content of the shell part 70 may be about 1.4 to 3.5 times the cobalt content of the core part 60.

In some embodiments, the core part 60 may have a composition represented by Formula 2 below.

  [Formula 2]

In Formula 2, M2 represents a dopant element, and may be selected from Na, Mg, Ca, Ti, V, Cr, Cu, Zn, Ge, Sr, Ag, Ba, Zr, Nb, Mo, Al, Ga or B. In Formula 2, cx, cy, cz and b may have a relationship of $0.7 \leq cx < 1$, $0 < cy \leq 0.2$, $0 \leq cz \leq 0.1$, and $0 \leq b \leq 0.5$. In a preferred embodiment, in Formula 2, the cx, cy, cz and b have a relationship of $0.75 \leq cx \leq 0.95$, $0.05 \leq cy \leq 0.15$, $0 \leq cz \leq 0.1$, and $0 \leq b \leq 0.5$. The above-described cx, cy, and cz may be adjusted under a condition that 1-cx-cy-cz, which is a content of manganese (Mn), is greater than 0.

In some embodiments, the shell part 70 may have a composition represented by Formula 3 below.

  [Formula 3]

In Formula 3, M3 represents a dopant element, and may be selected from Na, Mg, Ca, Ti, V, Cr, Cu, Zn, Ge, Sr, Ag, Ba, Zr, Nb, Mo, Al, Ga or B. In Formula 3, sx, sy, sz and c may have a relationship of $0.6 \leq sx < 0.9$, $0 < sy \leq 0.4$, $0 \leq sz \leq 0.1$, and $0 \leq c \leq 0.5$. In a preferred embodiment, in Formula 3, the sx, sy, sz and c have a relationship of $0.6 \leq sx \leq 0.9$, $0.08 \leq sy \leq 0.3$, $0 \leq sz \leq 0.1$, and $0 \leq c \leq 0.5$. The above-described sx, sy, sz and c may be adjusted under a condition that 1-sx-sy-sz, which is a content of manganese (Mn), is greater than 0.

As described above, the cobalt content of the shell part 70 may be adjusted in a range of about 1.4 to 6 times the cobalt content of the core part 60, and in Formulae 2 and 3, a relationship of $1.4 cy \leq sy \leq 6 cy$ may be satisfied.

According to exemplary embodiments, the shell part 70 containing high concentration or high content of cobalt may be provided as a surface coating layer of the core part 60 to suppress surface oxidation and decomposition of active metals such as lithium and nickel of the core part 60.

The lithium nickel oxide exposed to surfaces of the lithium metal oxide particle 50 may react with air or moisture, then decomposed into lithium hydroxide, lithium carbonate, nickel oxide and the like, thus to generate by-products. Further, nickel ions exposed to the surfaces of the lithium metal oxide particle may react with the electrolyte to cause a phase transition in a surface layer of the particle, and a modification in the crystal structure.

In the comparative example, in order to protect the lithium metal oxide particle 50, it may be considered to perform surface treatment or surface coating using NCM and other dissimilar metals such as Al, Ti, Zr, and Mg. However, in a case of the comparative example, a surface resistance of the lithium metal oxide particle 50 is excessively increased due to the dissimilar metal, such that the output/capacity of the secondary battery may be reduced. Thereby, when a small amount of dissimilar metal is used to prevent an increase in the surface resistance, it is difficult to secure sufficient surface stability of the lithium metal oxide particle 50.

However, according to exemplary embodiments of the present invention, the shell part 70 is formed to have a composition substantially the same as or similar to the core part 60. However, by increasing the concentration of cobalt, the shell part 70 may be substantially provided as a surface coating layer without additional transition metal doping.

Cobalt may be included as metal that improves a conductivity of the lithium secondary battery, and thus, by including the shell part 70, even the surface resistance of the lithium metal oxide particle 50 may be decreased, and thereby increasing the conductivity.

In addition, since the core part 60 and the shell part 70 have substantially the same or similar composition except for a difference in the concentration of elements, it is possible to maintain a uniform and stable crystal structure throughout the particle.

In some embodiments, the lithium metal oxide particle 50 may be an NCM lithium oxide including transition metal substantially composed of nickel, manganese and cobalt. In this case, in Formulae 1 to 3, tz, cz and sz may be 0 (zero), respectively. As dopants other than NCM are excluded and the high-concentration cobalt of the shell part 70 functions as a surface coating component, an increase in crystal instability and surface resistance due to the dopants may be prevented, and desired cathode active material activity may be efficiently secured.

Among the elements of the lithium metal oxide particle 50, manganese (Mn) may be provided as metal associated with the mechanical and electrical stabilities of the lithium secondary battery. For example, it is possible to suppress or reduce a fault such as an ignition, short-circuit, etc. which occurs when the cathode is penetrated by an external object caused by manganese, and thereby increasing the life-span of the lithium secondary battery.

In some embodiments, manganese may be included in a constant content and concentration throughout the core part 60 and the shell part 70. Accordingly, it is possible to secure uniform penetration stability and high temperature stability throughout the particle.

In addition, in the cathode active material, if the content of nickel is excessively increased, the life-span of the lithium secondary battery is decreased, and it may be disadvantageous in terms of mechanical and electrical stabilities, and faults such as an ignition, short-circuit, etc. may not be sufficiently suppressed upon occurring a penetration caused by an external object. According to exemplary embodiments, the content of nickel may be relatively increased in the core part 60 to provide sufficient power and capacity from the central portion of the particle, while the content of nickel may be relatively decreased in the shell part 70 to improve chemical, mechanical, and electrical properties of the cathode active material.

According to exemplary embodiments, the core part 60 may have a uniform composition. For example, the composition represented by Formula 2 may be uniformly maintained over the entire area of the core part 60 (e.g., without a concentration gradient according to the area). Accordingly, a high-output structure may be stably implemented through the high-content nickel throughout the core part 60, and surface protection may be stably provided through the high-content cobalt throughout the shell part 70.

In some embodiments, the shell part 70 may include a concentration gradient. For example, the content of nickel may be decreased, while the content of cobalt is increased from the outermost surface of the core part 60 to the outermost surface of the shell part 70.

Hereinafter, a method for manufacturing a cathode active material provided according to the embodiments of the present invention described above will be described.

According to exemplary embodiments, metal salts of the active material may be prepared. The metal salts of the active material may include nickel salts, manganese salts and cobalt salts. Examples of the nickel salt may include nickel sulfate, nickel hydroxide, nickel nitrate, nickel acetate, and a hydrate thereof, etc. Examples of the manganese salt may include manganese sulfate, manganese acetate, and a hydrate thereof, etc. Examples of the cobalt salt may include cobalt sulfate, cobalt nitrate, cobalt carbonate, a hydrate thereof, etc.

The metal salts may be mixed with a precipitant and/or a chelating agent in a ratio satisfying the content or concentration ratio of each metal in the core part 60 described with reference to Formula 2 to prepare an aqueous solution. The aqueous solution may be co-precipitated in a reactor to prepare a cathode active material precursor (e.g., an NCM precursor).

The precipitant may include an alkaline compound such as sodium hydroxide (NaOH), sodium carbonate ($Na_2CO_3$) and the like. The chelating agent may include, for example, ammonia water (e.g., $NH_3H_2O$), ammonium carbonate (e.g., $NH_3HCO_3$) and the like.

Thereafter, a lithium precursor compound may be mixed with the cathode active material precursor and reacted by co-precipitation to prepare preliminary a lithium metal oxide particle. The lithium precursor compound may include, for example, lithium carbonate, lithium nitrate, lithium acetate, lithium oxide, lithium hydroxide and the like. These compounds may be used alone or in combination of two or more thereof.

The preliminary lithium metal oxide particle may have a composition of the core part 60 substantially represented by Formula 2 throughout the particle.

The cobalt salt may be additionally added to the solution in which the preliminary lithium metal oxide particle is formed. The cobalt salt may be preliminarily coated or deposited on the surface of the preliminary lithium metal oxide particle to form a preliminary shell part.

The preliminary lithium metal oxide particle on which the preliminary shell part is formed may be collected through filtration, water washing, and/or drying processes, followed by performing heat treatment to convert the preliminary shell part into the shell part 70.

As metal elements including lithium and nickel contained in the surface of the preliminary lithium metal oxide particle are diffused into the preliminary shell part by the heat treatment, the shell part 70 may be formed. Thereby, the shell part 70 is formed to contain the cobalt in a relatively high concentration, and lithium metal oxide particle 50 defined as the core part 60 may be prepared in the remaining parts except for the shell part 70.

According to exemplary embodiments, the thickness and concentration ratio of the shell part 70 may be controlled by adjusting the temperature and time of the heat treatment. As described above, the thickness of the shell part 70 may be adjusted in a range of about 100 to 500 nm, and may include, for example, a depth region in a range of about 10 to 100 nm.

The cobalt concentration of the shell part 70 may be adjusted to about 1.4 to 6 times the cobalt concentration of the core part 60.

In some embodiments, the heat treatment may be performed at a temperature of about 650 to 800° C.

As described above, after forming the preliminary lithium metal oxide particle, only the cobalt salt may be selectively introduced therein to form the shell part 70 by performing heat treatment. Since the shell part 70 is formed through diffusion and crystal growth by performing heat treatment, an increase in resistance due to doping of heteroelements may be prevented, and formation of a low-resistance surface coating layer by using a high concentration of cobalt may be implemented.

FIG. 2 is a schematic cross-sectional view illustrating a lithium secondary battery according to exemplary embodiments.

Referring to FIG. 2, the lithium secondary battery may include a cathode 130, an anode 140, and a separation membrane 150 disposed between the cathode and the anode.

The cathode 130 may include a cathode current collector 110 and cathode active material layers 115 formed by applying a cathode active material to the cathode current collector 110. According to exemplary embodiments, the cathode active material may include the lithium metal oxide particle 50 which include the core part 60 and the shell part 70, and have a high content cobalt surface coating layer provided thereon by the shell part 70, respectively.

A slurry may be prepared by mixing the cathode active material with a binder, a conductive material and/or a dispersant in a solvent, and stirring the same. The slurry may be coated on the cathode current collector 110, followed by compressing and drying to manufacture the cathode 130.

The cathode current collector 110 may include, for example, stainless steel, nickel, aluminum, titanium, copper, or an alloy thereof, and preferably includes aluminum or an aluminum alloy.

The binder may include, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a cathode forming binder. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

According to exemplary embodiments, the anode 140 may include an anode current collector 120 and anode active material layer 125 formed by coating the anode current collector 120 with an anode active material.

The anode active material useable in the present invention may include any material known in the related art, so long as it can absorb and desorb lithium ions, without particular limitation thereof. For example, carbon-based materials such as crystalline carbon, amorphous carbon, carbon composite, carbon fiber, etc.; a lithium alloy; silicon or tin may be used. Examples of the amorphous carbon may include hard carbon, cokes, mesocarbon microbead (MCMB) calcined at a temperature of 1500° C. or less, mesophase pitch-based carbon fiber (MPCF) or the like. The crystalline carbon may include graphite-based carbon such as natural graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The anode current collector 120 may include, for example, gold, stainless steel, nickel, aluminum, titanium, copper, or an alloy thereof, and preferably includes copper or a copper alloy.

In some embodiments, a slurry may be prepared by mixing the anode active material with a binder, a conductive material and/or a dispersant in a solvent, and stirring the same. The slurry may be coated on the anode current collector 120, followed by compressing and drying to manufacture the anode 140.

As the binder and the conductive material, materials which are substantially the same as or similar to the above-described materials may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

A separation membrane 150 may be interposed between the cathode 130 and the anode 140. The separation membrane 150 may include a porous polymer film made of a polyolefin polymer such as ethylene homopolymer, propylene homopolymer, ethylene/butene copolymer, ethylene/hexene copolymer, ethylene/methacrylate copolymer. The separation membrane may include a nonwoven fabric made of glass fiber having a high melting point, polyethylene terephthalate fiber or the like.

In some embodiments, the anode 140 may have an area (e.g., a contact area with the separation membrane 150) and/or volume larger than those/that of the cathode 130. Thereby, lithium ions generated from the cathode 130 may smoothly move to the anode 140 without being precipitated in the middle, for example. Therefore, effects of simultaneously improving the output and stability by using the above-described cathode active material may be more easily realized.

According to exemplary embodiments, the electrode cell 160 is defined by the cathode 130, the anode 140, and the separation membrane 150, and a plurality of electrode cells 160 are stacked to form, for example, a jelly roll type electrode assembly. For example, the electrode assembly may be formed by winding, laminating, folding, or the like of the separation membrane.

The electrode assembly is housed in an outer case 170 together with the electrolyte, such that a lithium secondary battery may be defined. According to exemplary embodiments, a non-aqueous electrolyte may be used as the electrolyte.

The non-aqueous electrolyte includes a lithium salt as an electrolyte and an organic solvent. The lithium salt is represented by, for example, $Li^+X^-$, and may include $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and the like as an example.

Examples of the organic solvent may use any one of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, and tetrahydrofurane, or a mixture of two or more thereof. These compounds may be used alone or in combination of two or more thereof.

Electrode tabs may be respectively formed from the cathode current collector 110 and the anode current collector 120 belonging to each electrode cell and may extend to one side of the outer case 170. The electrode tabs may be fused together with the one side of the outer case 170 to form an electrode lead extending or exposed to an outside of the outer case 170.

The lithium secondary battery may be manufactured, for example, in a cylindrical shape using a can, a square shape, a pouch shape or a coin shape.

Hereinafter, preferred examples are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

(1) Preparation of Cathode Active Material (Lithium Metal Oxide)

Example 1

$NiSO_4$, $CoSO_4$, and $MnSO_4$ were mixed in a ratio (molar ratio) of 0.75:0.15:0.10, respectively, using distilled water with internal dissolved oxygen removed by bubbling with $N_2$ for 24 hours. The solution was introduced into a reactor at 50° C., and a co-precipitation reaction was performed for 48 hours using NaOH and $NH_3H_2O$ as a precipitant and a chelating agent to form an NCM precursor.

Thereafter, lithium hydroxide was further added thereto so that a ratio of the NCM precursor to the lithium hydroxide was 1:1.05, followed by uniformly stirring and mixing the same. The mixture was put in a calcination furnace, heated to 800° C. at a heating rate of 2° C./min, and maintained at 800° C. for 10 hours, followed by performing a reaction, to form preliminary lithium metal oxide particles.

3% by weight of $Co(OH)_3$ was introduced into the preliminary lithium metal oxide particles, followed by stirring the same in a high-speed stirrer, then the mixture was put in a calcination furnace, heated to 700° C. at a heating rate of 2° C./min, and maintained at 700° C. for 10 hours. Thereby, a lithium metal oxide particle having a shell part formed thereon was prepared.

The prepared lithium metal oxide particles were filtered, washed with water, and then dried in a hot air dryer at 100° C. for 10 hours to obtain a cathode active material.

Example 2

A cathode active material was prepared according to the same procedures as described in Example 1, except that $NiSO_4$, $CoSO_4$, and $MnSO_4$ were mixed in a ratio (molar ratio) of 0.8:0.1:0.1, respectively, when forming the NCM precursor, and the calcination temperature for forming preliminary lithium metal oxide particles was adjusted to 750° C.

Example 3

A cathode active material was prepared according to the same procedures as described in Example 1, except that $NiSO4_4$, $CoSO4_4$, $MnSO4_4$ were mixed in a ratio (molar ratio) of 0.88:0.09:0.03, respectively, when forming the NCM precursor, and the calcination temperature for forming preliminary lithium metal oxide particles was adjusted to 700° C.

Example 4

A cathode active material was prepared according to the same procedures as described in Example 3, except that the calcination temperature for forming preliminary lithium metal oxide particles was adjusted to 600° C.

Example 5

A cathode active material was prepared according to the same procedures as described in Example 3, except that $NiSO4_4$, $CoSO4_4$, and $MnSO4_4$ were mixed in a ratio (molar ratio) of 0.92:0.05:0.03, respectively, when forming the NCM precursor.

Example 6

A cathode active material was prepared according to the same procedures as described in Example 4, except that $NiSO4_4$, $CoSO4_4$, and $MnSO4_4$ were mixed in a ratio (molar ratio) of 0.92:0.05:0.03, respectively, when forming the NCM precursor.

Comparative Examples 1 to 4

A lithium metal oxide particle having a uniform composition throughout the particle was prepared by directly performing heat treatment on preliminary lithium metal oxide particles without substantially no formation of the shell part in Example 1. The mixing ratios of $NiSO4_4$, $CoSO4_4$, and $MnSO4_4$ in each comparative example are the same as the ratios of Ni, Co and Mn in Table 1 below.

Comparative Example 5

A cathode active material was prepared according to the same procedures as described in Example 3, except that the calcination temperature for the preliminary lithium metal oxide particles was adjusted to 400° C.

Comparative Example 6

A cathode active material was prepared according to the same procedures as described in Comparative Example 5, except that the calcination temperature for the preliminary lithium metal oxide particles was adjusted to 300° C.

Comparative Example 7

A cathode active material was prepared according to the same procedures as described in Example 5, except that the calcination temperature for the preliminary lithium metal oxide particles was adjusted to 300° C.

Transition metal ratio analysis of the cathode active materials prepared in the above examples and comparative examples was performed. Specifically, after exposing a cross section of the particle by cutting the same using a focused ion beam (FIB), a molar ratio (core part composition) of Ni, Co and Mn in a central portion of the lithium metal oxide particle and a molar ratio (shell part composition) of Ni, Co and Mn in a depth region in a range of 10 to 100 nm from the surface the region were measured by an energy dispersive spectrometer (EDS). In addition, ratios of Ni, Co and Mn of the entire lithium metal oxide particle were measured using inductively coupled plasma (ICP).

The measurement results are shown in Table 1 below.

TABLE 1

| | Total molar ratio of particle | | | Molar ratio of core part | | | Molar ratio of shell part | | | Co ratio of shell part/core part |
|---|---|---|---|---|---|---|---|---|---|---|
| | Ni | Co | Mn | Ni | Co | Mn | Ni | Co | Mn | |
| Example 1 | 0.74 | 0.16 | 0.10 | 0.75 | 0.15 | 0.10 | 0.61 | 0.30 | 0.09 | 2.00 |
| Example 2 | 0.79 | 0.11 | 0.10 | 0.80 | 0.10 | 0.10 | 0.66 | 0.25 | 0.09 | 2.50 |
| Example 3 | 0.86 | 0.12 | 0.02 | 0.88 | 0.09 | 0.03 | 0.85 | 0.13 | 0.02 | 1.44 |
| Example 4 | 0.86 | 0.12 | 0.03 | 0.88 | 0.09 | 0.03 | 0.68 | 0.30 | 0.02 | 3.33 |
| Example 5 | 0.90 | 0.08 | 0.02 | 0.92 | 0.05 | 0.03 | 0.90 | 0.08 | 0.02 | 1.60 |
| Example 6 | 0.90 | 0.07 | 0.03 | 0.92 | 0.05 | 0.03 | 0.68 | 0.30 | 0.02 | 6.00 |
| Comparative Example 1 | 0.75 | 0.15 | 0.10 | 0.75 | 0.15 | 0.10 | 0.75 | 0.15 | 0.10 | 1.00 |
| Comparative Example 2 | 0.80 | 0.10 | 0.10 | 0.80 | 0.10 | 0.10 | 0.80 | 0.10 | 0.10 | 1.00 |
| Comparative Example 3 | 0.88 | 0.09 | 0.03 | 0.88 | 0.09 | 0.03 | 0.88 | 0.09 | 0.03 | 1.00 |
| Comparative Example 4 | 0.93 | 0.05 | 0.02 | 0.93 | 0.05 | 0.02 | 0.93 | 0.05 | 0.02 | 1.00 |
| Comparative Example 5 | 0.82 | 0.15 | 0.03 | 0.88 | 0.09 | 0.03 | 0.28 | 0.72 | 0.02 | 7.98 |
| Comparative Example 6 | 0.80 | 0.17 | 0.03 | 0.88 | 0.09 | 0.03 | 0.08 | 0.90 | 0.02 | 10.00 |
| Comparative Example 7 | 0.88 | 0.09 | 0.03 | 0.92 | 0.05 | 0.03 | 0.48 | 0.50 | 0.02 | 10.00 |

FIGS. 3A and 3B are an SEM image and a graph showing a composition of the lithium metal oxide particle prepared according to Example 4, respectively.

Referring to FIGS. 3A and 3B, the shell part having an increased cobalt content and a reduced nickel content at a thickness of about 300 nm was formed in the lithium metal oxide particle having a diameter of about 16 μm.

FIGS. 4A and 4B are an SEM image and a graph showing a composition of the lithium metal oxide particle prepared according to Comparative Example 3, respectively.

Referring to FIGS. 4A and 4B, the lithium metal oxide particle having a uniform composition throughout the particle having a diameter of about 14 μm was formed.

FIGS. 5A and 5B are an SEM image and a graph showing a composition of the lithium metal oxide particle prepared according to Comparative Example 5, respectively.

Referring to FIGS. 5A and 5B, the shell part was extended from a lithium metal oxide particle having a diameter of about 14 μm to a thickness of about 1 μm.

FIG. 6 is TEM images of a surface of the lithium metal oxide particle of Example 4. FIG. 7 is TEM images of a surface of the lithium metal oxide particle of Comparative Example 5.

Referring to FIGS. 6 and 7, in the case of Example 4, it can be confirmed that the crystal structures on the surface and inside of the particle are substantially the same as each other. However, in the case of Comparative Example 5, as the cobalt content of the shell part was excessively increased, the crystal structures of the surface and the inside of the particle were different from each other, thereby resulting in a phase separation.

(2) Manufacture of Secondary Battery

Secondary batteries were manufactured using the cathode active materials prepared in the examples and comparative examples described in the above Table 1. Specifically, the cathode active material, Denka Black as a conductive material and PVDF as a binder were mixed in a mass ratio composition of 94:3:3, respectively, to prepare a cathode slurry. Then, the slurry was applied to an aluminum current collector, and a cathode was prepared through drying and pressing. After the pressing, the cathode was controlled so as to have an electrode density of 3.5 g/cc or more.

An anode slurry, which includes 93 wt % of natural graphite as an anode active material, 5 wt % of KS6 as a flake type conductive material, 1 wt % of styrene-butadiene rubber (SBR) as a binder, and 1 wt % of carboxymethyl cellulose (CMC) as a thickener, was prepared. The anode slurry was applied to a copper substrate, followed by drying and pressing to prepare an anode.

The cathodes and the anodes prepared as described above were respectively notched in a predetermined size and stacked, then an electrode cell was fabricated between the cathode and the anode with a separator (polyethylene, thickness: 25 μm) interposed therebetween. Thereafter, tap parts of the cathode and the anode were welded, respectively. A combination of the welded cathode/separator/anode was put into a pouch, followed by sealing three sides of the pouch except for one side into which an electrolyte is injected. At this time, a portion having the electrode tab was included in the sealing part. After injecting the electrolytic through the remaining one side except for the sealing part, and the remaining one side was also sealed, followed by impregnation for 12 hours or more.

The electrolyte used herein was prepared by dissolving 1M $LiPF_6$ solution in a mixed solvent of EC/EMC/DEC (25/45/30; volume ratio), and adding 1 wt. % of vinylene carbonate (VC), 0.5 wt. % of 1,3-propene sultone (PRS), and 0.5 wt. % of lithium bis(oxalato)borate (LiBOB) thereto.

Experimental Example (1) Measurement of 0.1 C Initial Capacity/Efficiency

Initial discharge capacities were measured by charging (CC/CV 0.1 C 4.3 V 0.05 CA CUT-OFF) and discharging (CC 0.1 C 3.0 V CUT-OFF) once with the battery cells according to the examples and the comparative examples (CC: constant current, CV: constant voltage).

Initial efficiency was measured as a percentage value obtained by dividing the initial discharge amount measured above by the initial charge amount.

(2) Measurement of 1 C Discharge Capacity

Discharge capacities were measured by charging (CC/CV 0.5 C 4.3 V 0.05 CA CUT-OFF) and discharging (CC 1.0 C 3.0 V CUT-OFF) with the secondary batteries according to the examples and comparative examples.

(3) Measurement of Capacity Retention Rate for 300 Cycles

The cycle performed at the time of measuring the 1 C discharge capacity was repeated 300 times to evaluate the capacity retention rate as a percentage of the value obtained by dividing the discharge capacity at 300 times by the discharge capacity at one time.

The evaluation results are shown in Table 2 below.

TABLE 2

| Section | 0.1 C initial capacity/efficiency | | | Discharge capacity (mAh/g) | Capacity retention rate for 300 cycles |
|---|---|---|---|---|---|
| | Charge (mAh/g) | Discharge (mAh/g) | Efficiency | | |
| Example 1 | 194 | 179 | 93% | 159 | 92 |
| Example 2 | 214 | 195 | 91% | 175 | 80 |
| Example 3 | 237 | 213 | 90% | 193 | 77 |
| Example 4 | 237 | 212 | 89% | 192 | 82 |
| Example 5 | 243 | 216 | 89% | 196 | 64 |
| Example 6 | 243 | 214 | 88% | 194 | 70 |
| Comparative Example 1 | 210 | 193 | 92% | 173 | 74 |
| Comparative Example 2 | 226 | 203 | 90% | 183 | 67 |
| Comparative Example 3 | 236 | 208 | 88% | 188 | 53 |
| Comparative Example 4 | 247 | 212 | 86% | 192 | 46 |
| Comparative Example 5 | 222 | 182 | 82% | 162 | 80 |
| Comparative Example 6 | 211 | 146 | 69% | 126 | 98 |
| Comparative Example 7 | 210 | 149 | 71% | 129 | 92 |

Referring to Table 2 above, in the case of the examples in which the lithium metal oxide particle including the high-concentration cobalt shell part formed therein was prepared, remarkably improved capacity retention rates were obtained compared to Comparative Examples 1 to 4 in which the shell part is not substantially formed in the particle.

On the other hand, in the case of Comparative Examples 5 to 7 in which the cobalt content of the shell part was excessively increased compared to the core part, the initial efficiency and discharge capacity values were excessively decreased.

The invention claimed is:

1. A cathode active material for a lithium secondary battery comprising:
a lithium metal oxide particle which includes a core part and a shell part and contains nickel (Ni), cobalt (Co) and manganese (Mn),
wherein a total Ni content of the lithium metal oxide particle is 75 mol % or more based on a total 100 mol % of Ni, Co and Mn,
wherein the core part does not have a concentration gradient of nickel, cobalt and manganese,
the shell part includes a depth region in a range of 10 to 100 nm from a surface of the lithium metal oxide particle, a Co content thereof in the depth region is 1.4 to 6 times a Co content of the core part, and a concentration gradient.

2. The cathode active material for a lithium secondary battery according to claim 1, wherein a total average composition of the lithium metal oxide particle is represented by Formula 1 below:

[Formula 1]

wherein in Formula 1, M1 is at least one selected from the group consisting of Na, Mg, Ca, Ti, V, Cr, Cu, Zn, Ge, Sr, Ag, Ba, Zr, Nb, Mo, Al, Ga and B, and,
tx, ty, tz and a have a relationship of 0.75≤tx<1, 0<ty≤0.2, 0≤tz≤0.1, 0≤a≤0.5, and 0<1-tx-ty-tz.

3. The cathode active material for a lithium secondary battery according to claim 2, wherein in Formula 1, the tx and ty have a relationship of 0.75≤tx≤0.9 and 0.1<ty≤0.2.

4. The cathode active material for a lithium secondary battery according to claim 2, wherein the core part has a composition represented by Formula 2 below, and the shell part has a composition represented by Formula 3 below:

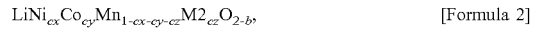

[Formula 2]

wherein in Formula 2, M2 is at least one selected from the group consisting of Na, Mg, Ca, Ti, V, Cr, Cu, Zn, Ge, Sr, Ag, Ba, Zr, Nb, Mo, Al, Ga and B, and,
cx, cy, cz and b have a relationship of 0.7≤cx<1, 0<cy≤0.2, 0≤cz≤0.1, 0≤b≤0.5, and 0<1-cx-cy-CZ,

[Formula 3]

wherein in Formula 3, M3 is at least one selected from the group consisting of Na, Mg, Ca, Ti, V, Cr, Cu, Zn, Ge, Sr, Ag, Ba, Zr, Nb, Mo, Al, Ga and B, and,
sx, sy, sz and c have a relationship of 0.6≤sx<0.9, 0<sy≤0.4, 0≤sz≤0.1, 0≤c≤0.5, and 0<1-sx-sy-SZ.

5. The cathode active material for a lithium secondary battery according to claim 4, wherein in Formula 2, the cx and cy have a relationship of 0.75≤cx≤0.95 and 0.05≤cy≤0.15.

6. The cathode active material for a lithium secondary battery according to claim 4, wherein in Formula 3, the sx and sy have a relationship of 0.6≤sx≤0.9 and 0.08≤sy≤0.3.

7. The cathode active material for a lithium secondary battery according to claim 1, wherein metals other than lithium contained in the lithium metal oxide particle are composed of Ni, Co and Mn.

8. The cathode active material for a lithium secondary battery according to claim 1, wherein the core part has a uniform composition over an entire area of the core part.

9. The cathode active material for a lithium secondary battery according to claim 1, wherein a content of Ni is decreased, while a content of Co is increased from an outermost surface of the core part to an outermost surface of the shell part.

10. The cathode active material for a lithium secondary battery according to claim 1, wherein a content of Mn is constant over an entire region of the lithium metal oxide particle.

11. A lithium secondary battery comprising:
an electrode assembly including a cathode including the cathode active material according to claim 1, an anode, and a separation membrane disposed between the cathode and the anode;
an outer case configured to house the electrode assembly; and an electrolyte in which the electrode assembly is impregnated in the outer case.

* * * * *